United States Patent [19]

Hale et al.

[11] Patent Number: 4,609,062
[45] Date of Patent: Sep. 2, 1986

[54] HEAVY-DUTY INDUSTRIAL WEIGHING SCALE

[75] Inventors: John D. Hale, East Ryegate, Vt.; Herbert L. Stott, Meridian, Miss.

[73] Assignee: Colt Industries Operating Corp., New York, N.Y.

[21] Appl. No.: 756,823

[22] Filed: Jul. 19, 1985

[51] Int. Cl.[4] .................. G01G 21/08; F16C 11/00
[52] U.S. Cl. .................. 177/256; 177/DIG. 9; 384/5
[58] Field of Search .................. 177/151-153, 177/256-259, DIG. 9; 308/6 R, 2 R

[56] References Cited

U.S. PATENT DOCUMENTS

| 525,411 | 9/1894 | Gates | 308/2 R |
|---|---|---|---|
| 1,167,311 | 1/1916 | Moore et al. | |
| 1,302,884 | 5/1919 | Varney | 177/DIG. 9 |
| 1,406,780 | 2/1922 | Thompson | 177/DIG. 9 |
| 4,126,873 | 11/1978 | Urano et al. | 354/468 |
| 4,190,344 | 2/1980 | Ishiguro et al. | 354/468 |
| 4,310,230 | 1/1982 | Motoori | 354/268 |
| 4,483,404 | 11/1984 | Weihs | 177/DIG. 9 |
| 4,502,774 | 3/1985 | Suzuki et al. | 354/468 |

FOREIGN PATENT DOCUMENTS 1806668  5/1973  Fed. Rep. of Germany.

Primary Examiner—George H. Miller, Jr.
Attorney, Agent, or Firm—Sixbey, Friedman & Leedom

[57] ABSTRACT

A weighing scale of the type utilizing a lever assembly to transfer a load from a weighing platform to a weight indicator by way of a suspension assembly interconnecting a platform load-transmitting beam to a lever of the lever assembly, with a suspension system having a pair of parallel rocker pins extending between the platform and a bearing member resting on a lever load pivot. The rocker pins have top ends which pivotally connect with the platform, and the pins extend downwardly to pivotally contact a pivot bearing member at their lower ends, so that the rocker pins move to accommodate any horizontal movement of the platform and isolate platform movement from the supporting bearing member. The rocker pins move, with respect to the bearing member, when the platform moves horizontally and the suspension assembly is designed so that those pins will abut the bearing member to control platform horizontal motion.

10 Claims, 4 Drawing Figures

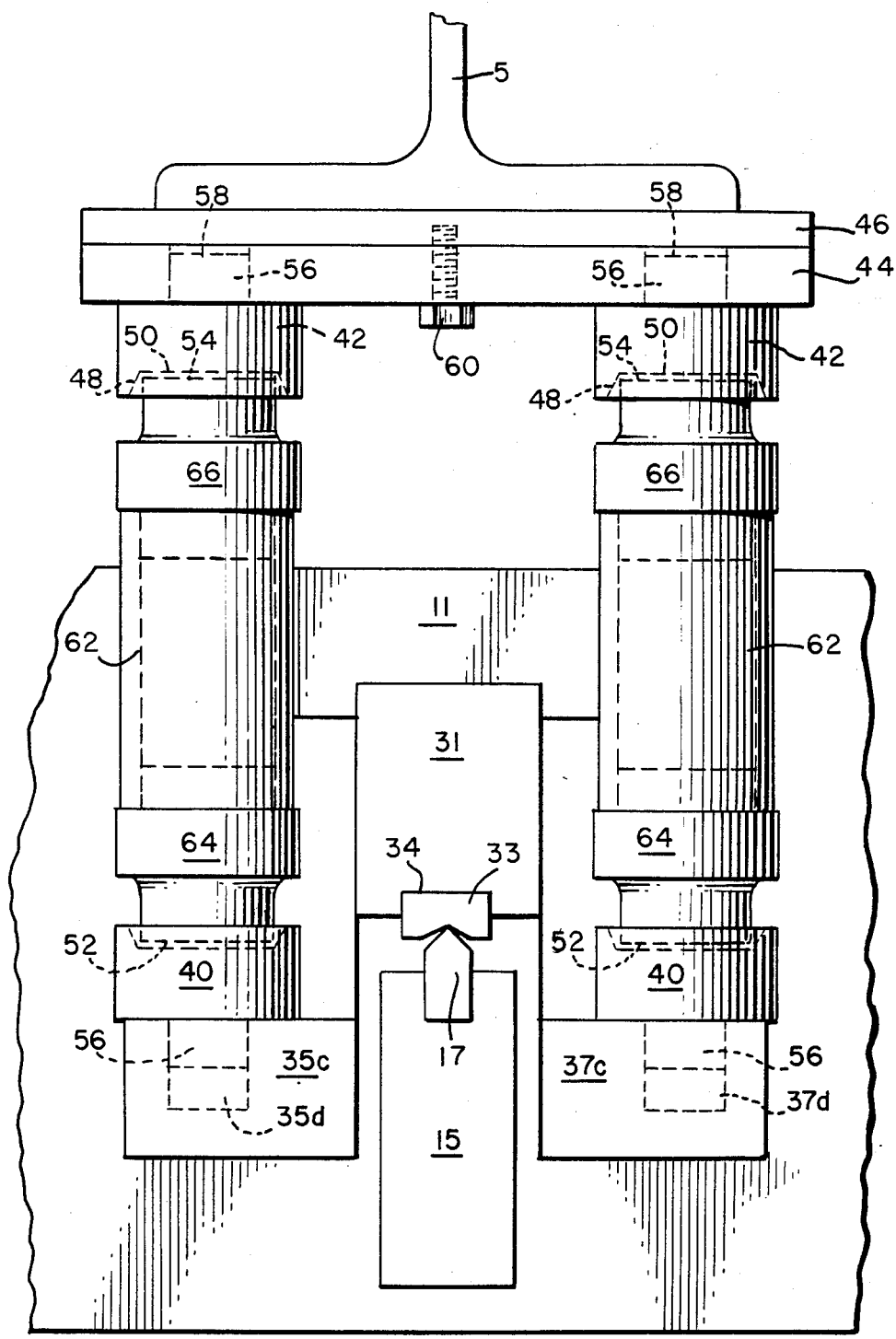

4,609,062

HEAVY-DUTY INDUSTRIAL WEIGHING SCALE

TECHNICAL FIELD

The present invention relates to heavy-duty industrial scales of the type which utilize a lever assembly for transferring a load placed upon a weighing platform to a weight indicator, and in particular, those utilizing a suspension assembly for interconnecting a platform load-transmitting beam to a lever of the lever assembly.

BACKGROUND ART

For the purpose of this application, it is noted that the term "heavy-duty industrial scale" is intended to refer to the numerous types of scales that are commonly used for weighing of large objects and heavy loads. Among these types of scales are warehouse scales, truck scales, railroad scales, grain dump scales, etc. Typically, such scales utilize a massive weighing platform which is coupled via a load transmission system to a weight indicator.

Generally, there are two types of load-transmitting systems that are utilized in heavy-duty scales. One system employs a transducer on a loaded beam and strain guages to convert elastic strain of the beam into electrical signals which are proportional to the load on the transducer. Other types of scales utilize a purely mechanical system for transmitting the load on the weighing platform to a weight indicator through mechanical movements that are a function of the load on the platform.

In mechanical systems, to avoid problems of side loading of the weighing platform, as might occur from a vehicle passing onto and off of the platform, link suspension assemblies have been utilized to interconnect the weighing platform load-transmitting beam to a lever of a lever assembly. In the weighing scale of U.S. Pat. No. 1,167,311, a single-link suspension system is utilized wherein the load from a platform girder is transmitted, by way of a platform supporting member, to a single link suspension member via a universal coupling at a bottom of the link; the top end of the link hanging on a saddle block that forms part of a knife-edge type pivot along with a knife-edge part carried by the main lever. However, despite the presence of a universal connection, this type of suspension, effectively, can only provide two degrees of freedom in the horizontal plane.

A second type of link suspension system commonly used in heavy-duty mechanical scales is a parallel link suspension system. The parallel link suspension system is well known and is found, commercially, in Fairbanks Morse "Type-S" scales produced by the Fairbanks Weighing Systems Division, of Colt Industries, St. Johnsbury, Vt. These scales encompass numerous types of heavy-duty industrial scales, including all of the types noted above. In the parallel link suspension system, a mount is connected to a platform load-transmitting beam and a pair of parallelly disposed spaced links interconnect the mount with a saddle block carrying one part of a knife-edge type pivot, the other part of which is carried by a main lever. In such a system, two pivots are created, a fulcrum pivot and a load pivot. The fulcrum pivot is defined by a knife-edge and bearing block and serves to transmit the load on the mount to ground as well as allowing an arm of the mount to rotate under a load applied to it. The load pivot transfers the applied load to the fulcrum through the parallel links which form a motion-isolating linkage. Some rotation is possible between the links at their upper and lower connecting points, but such will allow only two degrees of horizontal freedom without affecting the accuracy of the scale or the life of the pivot. Pivot life can be adversely affected by rocking or horizontal movement of the bearing block on the knife edge.

Additionally, since the multiple of the main lever is a function of the fulcrum distance (a shorter fulcrum distance producing a higher multiple) and since the fulcrum distance is a function of the width of the suspension system formed by the mount and links (a shorter width enabling a shorter fulcrum distance), link suspension systems inherently impose limits on the attainable fulcrum distance and lever multiple. Similarly, since link suspensions extend a significant distance below the associated main lever, they increase the overall height of the scale and, accordingly, the amount of space required for installation.

In contrast to the noted suspension systems used in purely mechanical scales, many electronic scales have utilized a suspension arrangement in the form of a single pin that is arranged to bear on the end of a load cell and extends vertically to contact an opposing flat surface. Shallow, spherical-shaped ends are provided on the rocker pins to provide a free-floating motion to the scale platform (that is limited by bumper checks) in order to minimize side loading of the load cell. An example of such an arrangement can be seen in German Auslegeschrift No. 1 806 668.

A rocker pin suspension is simpler and more compact that a link suspension; however, up until now, no workable arrangement has existed for adapting the rocker pin suspension concept utilized in electronic scales to purely mechanical lever scales of the type using link suspension systems. For example, if a single rocker pin, as used in the noted prior art electronic scales, were used at the load pivot of each main lever, such an arrangement would be unstable.

From the foregoing, it is apparent that a need has existed for a way in which heavy-duty industrial scales of the mechanical lever type can be provided with a simpler and more compact suspension than the existing link suspension systems and that affords more than two degrees of freedom of movement in a horizontal plane, while being adaptable to the requirements for a wide range of different sizes and types of scales.

DISCLOSURE OF THE INVENTION

It is an object of the present invention to provide a heavy-duty industrial weighing scale of the type utilizing a lever assembly to transfer a load from a weighing platform to a weight indicator by way of a suspension assembly interconnecting with a platform load-transmitting beam to a lever of the lever assembly, that will allow the weighing platform to move relative to the lever in any horizontal direction without producing rocking or horizontal movement between parts of knife-edge pivots of the lever assembly.

It is another object of the present invention to provide a novel and improved heavy-duty industrial weighing scale of the mechanical lever type having a suspension that is more compact than known link suspension systems and which permits a shorter fulcrum distance and a higher multiple in the main levers than is usually possible with such link suspension systems.

A still further object of the present invention is to provide a heavy-duty industrial weighing scale of the mechanical lever assembly type with a rocker pin suspension system that is simpler and less costly than known link suspension systems.

Yet another object of the present invention is to provide a rocker pin suspension system that can be incorporated into as wide a range of scales as the known link suspension systems and that will enable mechanical lever type load-transferring systems to be created that are adaptable to the requirements of a wide range of scale lengths and configurations, but will require no modifications to the design of otherwise conventional scales, beyond the suspension assembly itself.

These and other objects are accomplished, in accordance with a preferred embodiment of the present invention, by providing a weighing scale of the type utilizing a lever assembly to transfer a load from a weighing platform to a weight indicator by way of a suspension assembly interconnecting a platform load-transmitting beam to a lever of the lever assembly, with a suspension system having a pair of parallel rocker pins extending between the platform and a bearing member resting on a lever load pivot. The rocker pins have top ends which pivotally connect with the platform, and the pins extend downwardly to pivotally connect a pivot-bearing member at their lower ends, so that the rocker pins move to accommodate any horizontal movement of the platform and isolate platform movement from the supporting bearing member. The rocker pins move, with respect to the bearing member, when the platform moves horizontally and the suspension assembly is designed so that those pins will abut the bearing member to control platform horizontal motion. The connections between the pins and the platform and between the pins and the bearing member, include bearing cups which receive ends of the rocket pins and also control horizontal platform movement. In the preferred embodiment, the bearing member takes the form of a saddle member having one of a knife-edge part and a bearing block part of a pivot means for connecting the suspension assembly with the lever, and the saddle member is in the form of a saddle block carrying the saddle member part of the pivot means and a stirrup member depending from the saddle block at each of opposite sides of the saddle block, a respective bearing cup being mounted on each of the stirrups.

BRIEF DESCRIPTION OF THE DRAWINGS

FIG. 2 is a partially broken-away view, taken in the direction of the arrow X in FIG. 1, with the parts shown in their assembled condition;

BEST MODE FOR CARRYING OUT THE INVENTION

Figure 1:
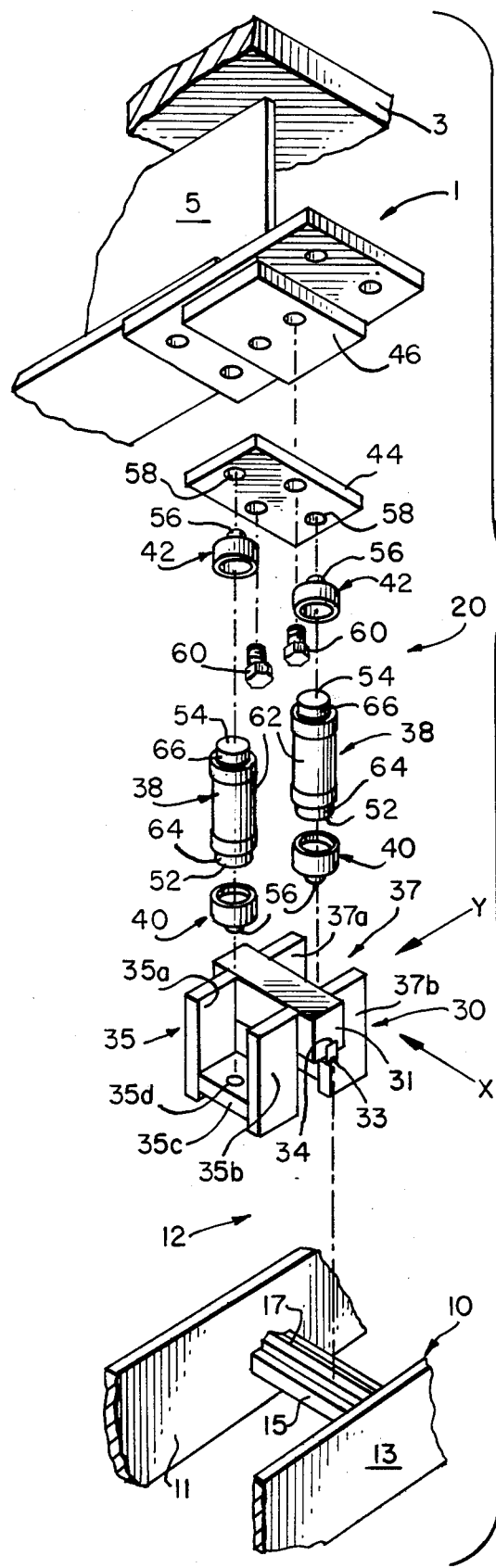
FIG. 1 is an exploded perspective of a corner portion of a weighing scale in accordance with the preferred embodiment of the present invention.

Inasmuch as the heavy-industrial weighing scale of the present invention is constructed in the same manner as any conventional mechanical lever scale, such as the above-noted commercially available Fairbanks Morse "Type S" scales and the weighing scale disclosed in U.S. Pat. No. 1,167,311, except for the suspension assembly, only that portion of the weighing scale relating to the suspension assembly will be described. Furthermore, while such known scales utilize a suspension assembly at each of a plurality of points spaced along the platform, and the nature of the suspension assembly and the relationship between the weighing platform and main lever is identical at each location, only a single such location will be illustrated and described. Those of ordinary skill in the art will be aware of the remaining details of such scales, as a whole, including the manner in which the loads transferred by the various main levers are summed and the weight displayed on a weight indicator. However, to the extent necessary, reference can be made to said patent and to available printed materials on the Fairbanks Morse "Type S" scales as well as the commercially available products themselves.

Turning now to the drawings, a preferred embodiment of the present invention will be described. The reference numeral 1 designates, generally, a conventional weigh bridge which, as is known, is composed of a weighing platform 3 and a supporting, load-transmitting beam 5. Depending upon the particular type of scale and the environment within which it is to be used, the platform may be formed of wood, metal, or concrete. Likewise, while an I beam is shown supporting the platform 3 and serving as a load-transmitting beam 5, it should be appreciated that a truss structure or other forms of platform supports commonly utilized in known scale structures may also be used, and the particular nature of the beam 5 is not material to the scope of the present invention.

Similarly, the main scale lever, indicated generally by the reference numeral 10, has only been illustrated with respect to its relevant portion and may be of any conventional form utilized to construct the main levers of a heavy-duty industrial scale. For example, such main levers may be of a rectangular, box-like construction (in which case, the reference numerals 11, 13 represent opposite longitudinal sidewalls thereof) or it may be a single piece lever having a vertical opening at the vicinity of its end portion (in which case, the reference numerals 11, 13 would represent diametrically opposite sides of the opening), or the one-piece main lever might have a Y-shaped fork at its end portion (in which case, the walls 11, 13 would be the legs of the fork-like end portion).

In order to form a load pivot 12, a knife-edge type pivot is utilized, as noted initially, and a transversely extending pivot support strut 15 may be provided for this purpose at an end portion of the lever. A knife-edge pivot 17 is shown mounted within a recess 16 formed on the top side of the support strut 15. The above-noted fulcrum pivot (not shown) would also be formed at the same end portion of the lever 10, but closer to the terminus thereof. The load on the weigh bridge 1 is transmitted to the lever 10 of the lever assembly at the load pivot 12 via the inventive suspension assembly 20.

The suspension assembly 20 includes a saddle member 30 that carries remaining parts forming the load pivot; namely, a saddle member mounting block 31 shown receiving a bearing block pivot 33 within a recess 34 in the bottom wall thereof. The bearing block pivot 33 rests on the knife-edge pivot 17, and while the saddle member is shown having the bearing block pivot 33, it should be appreciated that the bearing block pivot could be located in the support strut 15 and the knife-edge pivot 17 in the mounting block 31.

Figure 3:
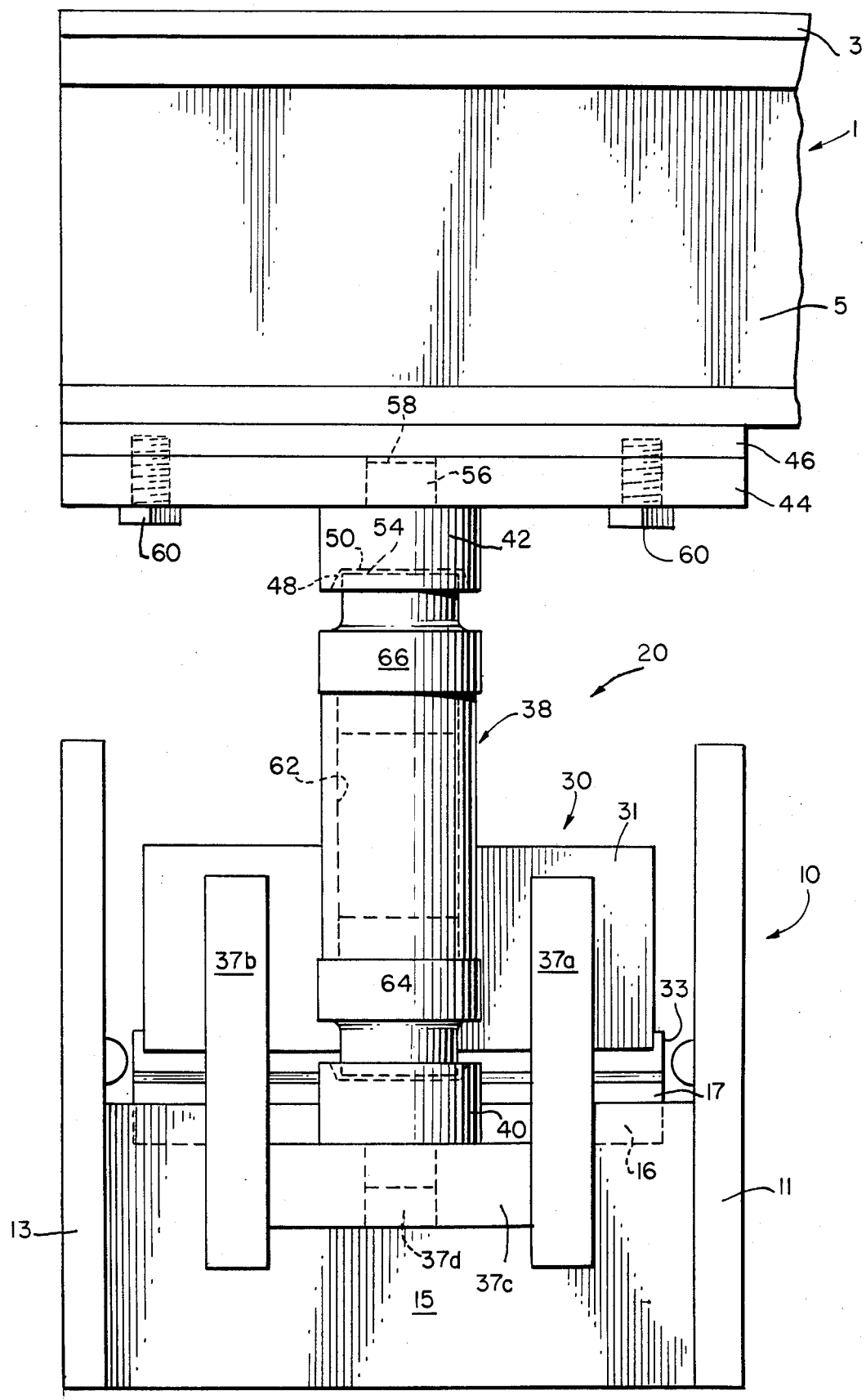
FIG. 3 is a view taken in the direction of the arrow Y in FIG. 1, with the parts being shown in their assembled condition.

The saddle member 30 also includes stirrup members 35 and 37 depending from the mounting block at each of opposite sides thereof. The stirrup members 35 and 37 include vertical side walls 35a,b and 37a,b having lower end portions interconnected by respective transverse walls 35c, 37c. As can be seen most clearly from FIG. 3, the length of mounting block 31 is less than the distance between the side walls 11, 13 of lever 10, and its width is greater than the width of support strut 15 (FIG. 2). In this manner, the saddle member 30 can be inserted between the side walls 11, 13 of the lever 10 so as to straddle the support strut with sufficient clearance between the stirrups 35, 37 and the support strut 15 to enable the mounting block 31 to rock, by way of the bearing block pivot 33, upon the knife-edge pivot 17 of the lever 10 to function as the pivot means forming the load pivot.

The load being weighed is transferred from the beam 5 to the saddle member 30 by way of a pair of identical load-transmitting rocker pins 38 having lower ends which are loosely received in a respective pair of sockets 40 carried by the saddle member 30. The upper ends of the rocker pins are received in a pair of sockets 42 that are carried by way of a mounting plate 44 and a connector plate 46.

Figure 4:
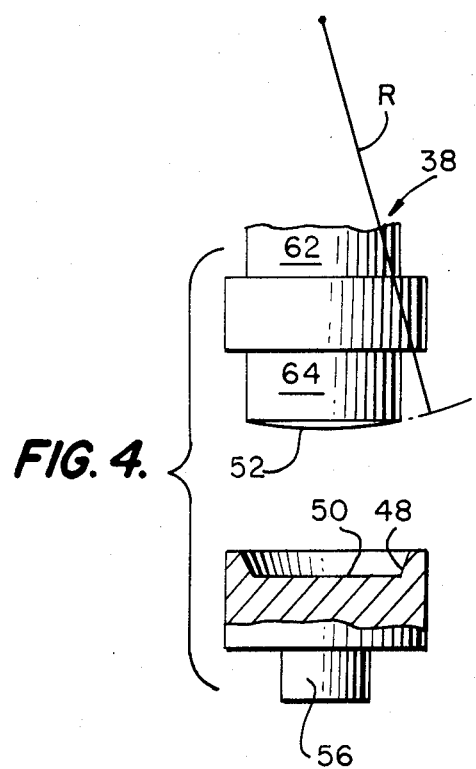
FIG. 4 is a sectional view of the socket of FIG. 1 in combination with one end of a rocker pin.

In accordance with the preferred embodiment, the sockets 40 and 42 are formed by bearing cups having a rocker pin receiving recess that is defined by a frusto-conical side wall 48 and a bottom wall 50 (FIG. 4). This recess is sized for enabling an end portion of a rocker pin 38 to be inserted therein and loosely supported in a generally vertical orientation, whereby the rocker pin is free to rock in any direction but is supported within the recess to such an extent that a rocker pin inserted into the recess will not fall out on its own. In this regard, in order to stabilize the rocker pins by gravity, the end surfaces 52 thereof are provided with a convexly spherical curvature having a radius R that is substantially greater than one-half of the overall length of the rocker pin, while the side walls 48 of the recess are frusto-conical, narrowing inwardly.

By way of example in FIG. 4, a rocker pin 38 having an overall length of approximately 6.25 inches, tip-to-tip, preferably has a conical end surface 52 at each end with a spherical radius of 6 inches, while the bearing cup is provided with a recess that is 0.25 inch deep with a minimum diameter of 1.5 inches and a maximum diameter of 1.65 inches for receiving a rocker pin end 52 of a diameter of 1.48 inches and enabling the pin to rock from vertical in any direction. The upper ends 54 of the rocker pins 38 are constructed in the same manner as the lower ends 52, while the upper pair of sockets 42 are identical to the lower pair of sockets 40. Thus the upper ends 54 of the load-transmitting rocker pins 38 are loosely received in the recesses of the bearing cups forming the upper sockets 42 in the same manner as the lower ends 52 are received in the recesses of the lower pair of sockets 40.

For mounting of the sockets 40 and 42, each of the bearing cups, in accordance with the illustrated embodiment, is provided with a mounting projection 56. The projections 56 of the sockets 40 are received in an aperture 35d or 37d formed in the transverse walls 35c and 37c respectively, and are secured therein by a threaded or force-fit connection. In a similar manner, the projections 56 of the sockets 42 are received in apertures 58 formed in the mounting plate 44. The mounting plate is detachably connectable by bolts 60 to the connector plate 46 that is welded or otherwise secured to the underside of the platform load-transmitting beam 5 of the weigh bridge 1.

While the rocker pins 38 can be made from steel rods, it is preferable, from a cost standpoint, to form the body of the rocker pins from strong steel pipe sections 62, and to form only the end portions 64 and 66 of solid material, these end portions being provided with mounting plugs for providing a force-fit connection of each end portion with the corresponding tubular body portion 62.

Due to the ability of the rocker pins 38 to pivot at their upper and lower ends within the recesses of the sockets 40 and 42, the platform 3 may move in any horizontal direction relative to the main lever 10 and load pivot 12, without transmitting horizontal forces to the main lever via the suspension assembly. Thus, the bearings and knife edges of the load pivot 12 and the fulcrum pivot (not shown) will be undisturbed despite, for example, a vehicle being driven onto and off the load platform 3. Furthermore, since the pair of rocker pins 38 are symmetrical and apply loads to the saddle member 30 on opposite sides of the center line of the bearing block pivot 33 and below the pivot axis thereof, the platform is suspended in a manner that allows the suspension elements, rather than the knife edges and bearings to absorb heavy impacts upon the platform.

The suspension of the present invention is advantageous relative to the above-noted link suspensions in that it is significantly more compact, both height-wise and width-wise. That is, the nature of link suspensions is such that, height-wise, they not only extend above the main lever, but they extend to even a greater extent below the main lever, as opposed to the suspension of the present invention which does not extend below the main lever 10. This enables the main lever to be disposed at a lower height relative to the ground, thereby reducing the height of the scale as a whole and the space required for installation thereof. Moreover, since the lever multiple is a function of the distance between the fulcrum pivot and the load pivot, the reduced width of the suspension assembly 20 (i.e., the breadth of the assembly shown in FIG. 2 and extending in the lengthwise direction of the lever 10), relative to that of corresponding link suspensions, enable the load pivot 12 to be shifted closer to the end of the lever and the fulcrum pivot located thereat with the result that a shorter fulcrum distance is achieved and a corresponding higher lever multiple obtained. This, in turn, offers the opportunity of either increasing the measurable range of the scale or utilizing smaller levers and more compact arrangements of the lever assembly and scale as a whole.

INDUSTRIAL APPLICABILITY

The present invention is applicable to heavy-duty industrial weighing scales of the type utilizing lever assemblies to transfer a load from a weighing platform to a weight indicator. It is usable in place of link type suspensions and is adaptable to the requirements for a wide range of scale lengths and configurations and, due to its relative compactness, is able to permit higher lever multiples to be obtained and the overall size of the scale to be reduced.

While I have shown and described a single embodiment in accordance with the present invetion, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

We claim:

1. A heavy-duty industrial weighing scale of the type utilizing a lever assembly to transfer a load from a weighing platform to a weight indicator and a suspension assembly for interconnecting a platform load-transmitting beam to a lever of the lever assembly, wherein said suspension assembly comprises:
   (A) a saddle member having one of a knife-edge and a bearing block of a pivot means for connecting the suspension assembly with said lever, the other of the knife-edge and bearing block of the pivot means being mounted to the lever;
   (B) pairs of socket means, one pair being carried by the saddle member and one pair being carried by the platform load-transmitting beam; and
   (C) load-transmitting rocker pins disposed parallel to each other with a first end of each pin being loosely received in a respective socket means on the saddle member and an opposite end of each pin being loosely received in a respective socket means of the load-transmitting beam in a manner enabling limited displacement of the platform load-transmitting beam relative to the lever in any horizontal direction without producing horizontal shifting of the knife-edge relative to the bearing block.

2. A weighing scale according to claim 1, wherein the saddle member comprises a mounting block carrying the saddle member part of the pivot means and a stirrup member depending from said mounting block at each of opposite sides of the mounting block, a respective socket means being mounted on each of said stirrup members.

3. A weighing scale according to claim 2, wherein each socket means comprises a bearing cup having a recess defined by a bottom wall and a peripheral side wall, said recess being sized for enabling one of the ends of a respective rocker pin to be inserted therein and loosely supported in a generally vertical orientation, whereby said rocker pin is free to rock in any direction within said recess to an extent limited by said side wall.

4. A weighing scale according to claim 3, wherein each said bearing cup is provided with a mounting projection on a side opposite said recess.

5. A weighing scale according to claim 3, wherein end surfaces of the ends of the rocker pins are provided with a spheric curvature having a radius substantially in excess of one-half of the length of the respective rocker pins for gravitational stabilization thereof.

6. A weighing scale according to claim 5, wherein said side wall is frusto-conical, narrowing inwardly.

7. A weighing scale according to claim 1, wherein each socket means comprises a bearing cup having a recess defined by a bottom wall and a peripheral side wall, said recess being sized for enabling one of the ends of a respective rocker pin to be inserted therein and loosely supported in a generally vertical orientation, whereby said rocker pin is free to rock in any direction within said recess to an extent limited by said side wall.

8. A weighing scale according to claim 7, wherein each said bearing cup is provided with a mounting projection on a side opposite said recess.

9. A weighing scale according to claim 7, wherein end surfaces of the ends of the rocker pins are provided with a spheric curvature having a radius substantially in excess of one-half of the length of the respective rocker pins for gravitational stabilization thereof.

10. A weighing scale according to claim 9, wherein said side wall is frusto-conical, narrowing inwardly.

* * * * *